Sept. 9, 1941.   F. DE L. BROWN   2,255,348
MOTOR VEHICLE
Filed June 26, 1939
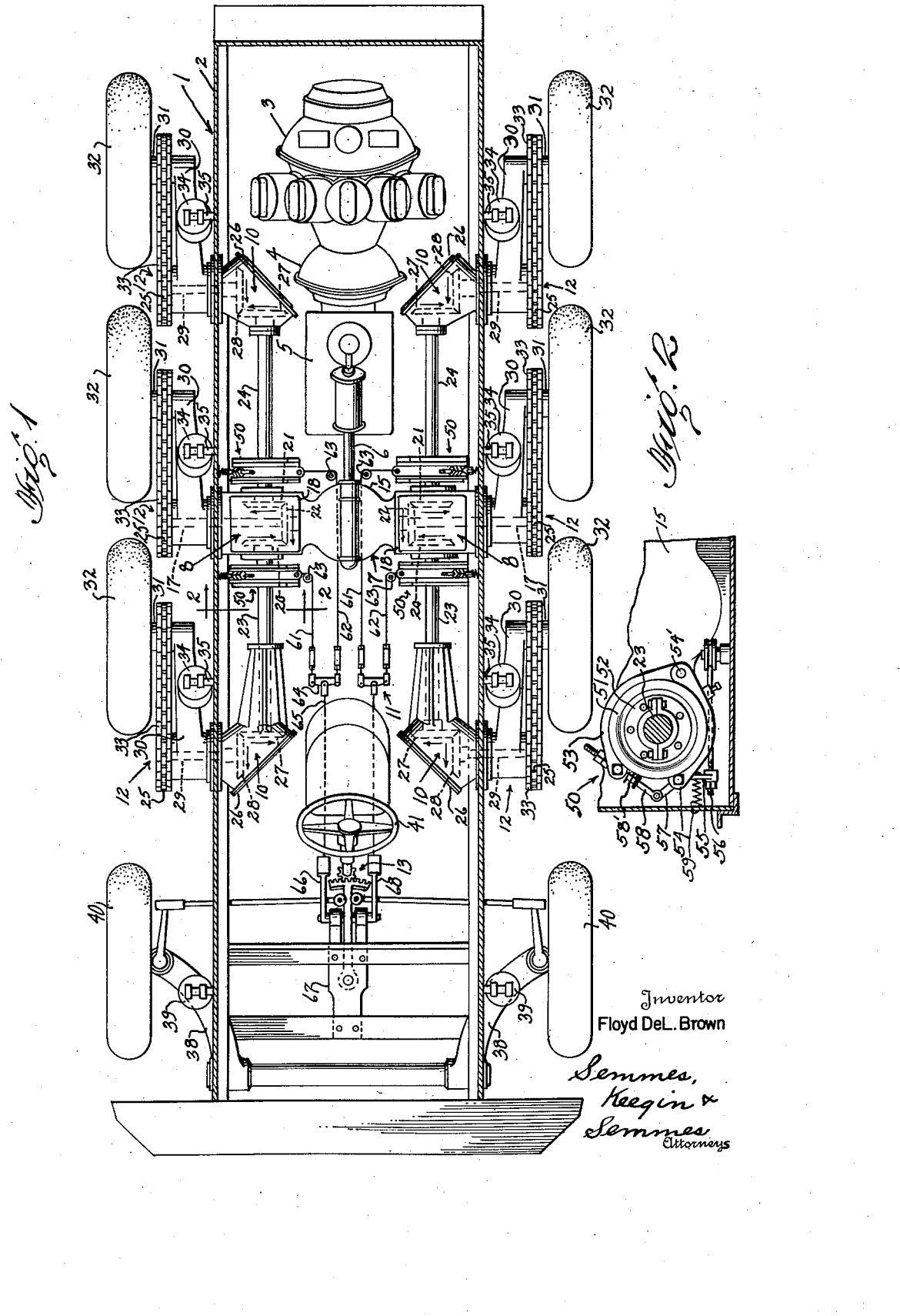
Inventor
Floyd DeL. Brown
Semmes,
Keegin &
Semmes
Attorneys Patented Sept. 9, 1941

2,255,348

UNITED STATES PATENT OFFICE 2,255,348

MOTOR VEHICLE

Floyd de L. Brown, New York, N. Y.

Application June 26, 1939, Serial No. 281,303

2 Claims. (Cl. 180—17)

This invention relates to an automotive unit which is supported by a plurality of wheel assemblies, and more especially to a brake mechanism which is so constructed that a braking effect may be applied simultaneously either to all of the drive wheels or only to the drive wheels mounted on either side of the vehicle.

One of the objects of my invention is to provide a motor vehicle having one or more pair of drive wheel assemblies, each of which is driven from a main drive mechanism.

Another object of my invention is to provide a motor vehicle of the type described provided with a braking mechanism which is designed to provide simultaneously a braking effect to all of the drive wheels which support the motor vehicle.

A further object of my invention is to provide a motor vehicle having a braking mechanism which is constructed in such a manner that the braking effect may be applied to the drive wheels on one side of the vehicle, thereby enabling the vehicle to be turned in a shorter radius.

With these and other objects in view, my invention embraces broadly the concept of a motor vehicle having a braking mechanism which is constructed in such a manner that the operator of the vehicle may selectively apply a braking effect to all of the drive wheels of the vehicle or only to the drive wheels supporting one side of the vehicle. The mechanism is so constructed that the rotation of the drive wheels to which the braking effect is applied may be either simultaneously slowed down or stopped. This construction is highly advantageous, because, in addition to using the brake mechanism to slow down or stop the motion of the vehicle, this mechanism may also be used to aid in turning the vehicle sharply, especially on sandy ground or on a slippery surface.

In operation, if the braking mechanism is applied in such a manner that the rate of rotation of the wheels on one side is reduced, the differential construction which forms a part of the main drive mechanism causes the drive wheels on the opposite side of the vehicle to increase their rate of rotation an amount directly proportional to the decrease in rotation of the wheels on the opposite side of the motor vehicle to which the braking effect has been applied. This results in the vehicle using the braked wheels as a pivotal axis for swerving sharply in one direction. If, on the other hand, the rotation of the wheels on one side of the vehicle is completely stopped by braking without changing the engine speed, the rate of rotation on the opposite side of the vehicle is doubled. This action results in the vehicle being swerved even more sharply.

It is believed apparent from the above description that I have provided a motor vehicle provided with a type of braking mechanism by means of which the direction as well as the rate of motion of the motor vehicle may be readily controlled. While I have shown a motor vehicle having six drive wheels, it is within the scope of this invention to use any number of wheels, the number depending entirely upon the requirements of the type of vehicle to which my invention is applied. The main drive mechanism can also be varied and mechanical equivalents and changes of location may be applied to the brake construction without departing from the spirit and scope of this invention. For instance, if desired, the brake drums may be mounted on the hubs of the drive wheels instead of being attached to the shafts which supply torque to the drive wheels.

In the drawing:

Figure 1 is a plan view of the motor vehicle disclosing the main drive and the brake mechanism.

Figure 2 is a detailed sectional view showing one of the brake assemblies taken on line 2—2 of Fig. 1.

As shown in the drawing, my invention relates to a motor vehicle, generally designated by the numeral 1, which consists of a frame 2, power unit 3, clutch 4, transmission 5, drive shaft 6, differential gear 7, distribution gears 8, a plurality of transmission gears 10, braking mechanism 11, a plurality of wheel assemblies 12, and a steering assembly 13. The power unit 3 is mounted on the rear portion of the frame 2 between the rear drive wheels 12 and is operatively connected to the differential gear 7 through the clutch 4, transmission 5 and drive shaft 6.

The differential gear 7 consists of a housing 15 which is indirectly supported by the frame 2 as will be subsequently described. The differential gear 7 is of usual construction and is driven by the drive shaft 6.

The differential gear is adapted to impart a torque to a pair of shafts 17 which extend in opposite directions transversely across the frame 2 and are journalled in bearings carried by the housings 18 which inclose the distribution gears 8. These housings are mounted on the frame 2 and support between them the differential gear housing 15. As these distribution gears 8 and the drive and brake mechanisms situated on opposite sides of the frame 2 are identical, the main drive mechanism and brake mechanism will be described for one side only, it being understood that the identical parts on the opposite side of the frame bear the same numbers.

The distribution gear housing 18 incloses a pair of beveled gears 20 and 21 which are driven by a beveled gear 22 attached to the shaft 17. The gears 20 and 21 are mounted on the extremities of a forwardly extending shaft 23 and a rearwardly extending shaft 24, respectively. These shafts are journalled in bearings which are carried by the housing 18. The shaft 17 passes through an aperture in the frame 2 and its outer extremity is provided with a sprocket 25.

The forwardly extending shaft 23 and the rearwardly extending shaft 24 terminate in housings 26 which inclose the beveled gearing 10. As the beveled gear housings 26 are identical in construction, only the one connected to the forwardly extending shaft 23 will be described for purposes of illustration.

The shaft 23 extends into the housing 26 and its forward extremity is provided with a beveled gear 27 which constantly engages a beveled gear 28 through which torque is supplied to a shaft 29. The shaft 29 is carried by a tubular member which is rigidly mounted in an aperture in the frame 2 and has affixed to its outer end a driving sprocket 25.

Each of the wheel assemblies 12 consists of a radial arm 30, one extremity of which is pivotally mounted on the tubular member previously described which carries the shaft 29. The opposite extremity of the radial arm 30 carries a stub shaft on which is mounted the hub 31 which supports the wheel 32. A sprocket is rigidly mounted on the hub 31 and is driven by the previously mentioned sprocket 25 mounted on the shaft 29 by means of a chain or other suitable connecting means 33.

Each radial arm 30 is suspended and its motion retarded by a compression unit 34 which is carried by a bracket 35 mounted on the exterior surface of the frame 2. The lower extremity of the compression unit is mounted on the radial arm 30 at a point intermediate its length.

From this description it is believed apparent that, by means of this main drive mechanism, power after being supplied to the differential 7 in the manner previously described is supplied directly to each of the centrally located drive wheels by the shafts 17. The driving shafts 17 also supply torque through the distribution gearing 8 and the beveled gearing 10 to the forward and rear drive wheels. This torque is transmitted through each of the beveled gears 22 and the beveled gears 20 and 21 to the forward and rearwardly extending shafts 23 and 24, respectively, and is in turn transmitted by these shafts through the beveled gears 27 and 28 to the shaft 29 in the manner which has previously been described. The forward and rear drive wheels 32 are operatively connected to the main drive mechanism by the driving chains 33.

The steering unit 13 consists of a pair of radial arms 38 which are pivotally connected to the frame 2 and suspended by compression elements 39 which are similar in construction to the compression elements 34 which have previously been mentioned. Mounted on the free ends of the arms 38 are the front wheels 40. These front wheels 40 are operatively attached to the steering wheel 41 in any suitable manner.

The principal feature of this application resides in providing a braking mechanism which is so constructed that the operator of the motor vehicle may simultaneously slow down or stop all of the drive wheels of the motor vehicle or the drive wheels on only one side of the motor vehicle, thereby increasing the speed of rotation of the wheels mounted on the opposite side of the frame through the action of the differential gear 7.

In order to illustrate this type of brake mechanism, I have disclosed a brake, generally designated by the numeral 50, mounted on each of the forwardly extending shafts 23 and rearwardly extending shafts 24.

As best shown in Figure 2, each of these brake assemblies 50 consists of a drum 51 which is provided with a split collar 52 by means of which it is rigidly mounted, for example, on one of the drive shafts 23. Mounted on the drum 51 is an upper brake shoe 53 and a lower brake shoe 54 which are joined by an anchor pin 54'. The brake shoes 53 and 54 are forced against the periphery of the drum 51 by means of a lever 55 which is pivotally mounted on the extremity of the lower shoe 54.

The lower extremity of the lever 55 is bored to receive an adjustable cable end connector 56 and its upper extremity is in the form of a crank arm 57 upon which is mounted an adjustable link 58 which operatively connects the crank arm to the upper brake shoe 53. The brake shoes 53 and 54 are prevented from resting on the drum 51 by the resistance of the spring 58' which is mounted on the link 58. The lever 55 is tensioned between a retracting spring 59 and the cable end connector 56 which is attached to either an operating cable 61 or 62 in a manner which will now be described.

The action of each of the brake assemblies 50 mounted on the shafts 23 and 24 which form the drive mechanism of the right side of the vehicle is controlled by the operation of cables 61 and 62, respectively, which are attached to the cable end connector 56 of the brake assembly 50 which they are designed to control. Each of these cables is tensioned against a pulley 63 and their forward extremities are attached to the opposite extremities of an equalizer bar 64. This bar is connected through a cable 65 to a foot pedal 66 which is journalled in a bracket member 67 supported by the frame 2.

The brakes 50 mounted on the shafts 23 and 24 which form the drive mechanism for the left side of the machine are similarly connected to a foot pedal 68 which is also mounted on the bracket 67 in such a manner that the foot pedals may be operated either separately or simultaneously.

The operation of either of these foot pedals will cause an equalized tension to be exerted on the cables 61 and 62 to which it is connected through the cable 65 and equalizer bar 64. This causes the cable end connectors 56 which are attached to the cables 61 and 62 to be placed under sufficient tension to overcome the tension of the springs 59, causing the levers 55 to be rotated about their own axis. This movement of the levers 55 causes the crank arms 57 to draw the upper and lower brake shoes together by exerting sufficient force on the links 58 to overcome the tension of the springs 58'.

This action results in the brake shoes 53 and 54 exerting a braking effect upon the drums 51 to which the shafts 23 and 24 are attached. This braking effect is transmitted through the gears 10 to the forward and rear drive wheels and through the distribution gear box 8 to the shaft 17 by which it is transmitted to the centrally mounted drive wheel.

When the braking effect just described is applied to the main drive mechanism on the right side of the motor vehicle 1, the rate of rotation of the drive wheels which support this side is decreased, thereby increasing the rate of revolution of the drive wheels on the left side of the motor vehicle a proportional amount due to the differential action of the gear 7 which is transmitted directly through the shaft 17 to the centrally located drive wheels 32 and through the beveled gear 22 to the drive shafts 23 and 24 by which it is transmitted to the forward and rear drive wheels. In addition, if the pedal 66 is depressed sufficiently to completely stop the rotation of the drive wheels on the right side of the vehicle, the rate of rotation of the drive wheels on the left side of the vehicle will be doubled through the action of the differential gear 7.

This partial or complete braking by depression of the pedal 66 and the resulting increase in the rate of rotation of the wheels on the left side of the vehicle will cause the vehicle to swerve sharply to the right, especially if it is passing over sandy soil or over a slippery surface. If desired, the vehicle may be caused to swerve to the left in a similar manner by depressing the pedal 68. Moreover, the braking action may be equalized by depressing the pedals 66 and 68 simultaneously and equally. This action will cause the forward motion of the motor vehicle to be retarded or completely stopped.

From the above description it is believed apparent that I have provided a means for controlling the movement and decreasing the necessary turning radius of a vehicle supplied with a plurality of drive wheels. By the use of a braking mechanism of this type, a motor vehicle may be used to advantage under conditions which would be impractical with a motor vehicle equipped with the ordinary type of braking mechanism.

While for purposes of illustration I have described a motor vehicle of one construction and one means of mounting and connecting the braking mechanism, it is obvious that various changes can be made both in the motor vehicle construction and the arrangement and location of the parts of the braking mechanism without departing from the spirit of this invention. I, therefore, intend that this invention be only limited by the prior art and the scope of the appended claims.

I claim:

1. In a motor vehicle having a plurality of drive wheels on each side of the vehicle and a main drive mechanism from which torque is supplied through a differential to opposed drive shafts, said drive shafts being designed to drive two drive wheels mounted on opposite sides of the vehicle, opposed auxiliary shafts rigidly mounted on opposite sides of the vehicle and designed to supply torque to the remaining drive wheels supporting the corresponding sides of the vehicle, means connecting the auxiliary shafts mounted on each side of the vehicle to the opposed drive shaft which supplies power to that side of the vehicle, a braking mechanism mounted on each of the auxiliary shafts and adapted to supply the braking effect through the said shafts and connecting means to the drive wheels which support the motor vehicle, a pair of pedals which are mounted in such a manner that they may be operated independently, an equalizing means connected to each of the pedals, and means connecting the braking mechanisms mounted on opposite sides of the vehicle to separate equalizing means whereby movement of one of the pedals will be transmitted equally to the braking mechanisms located on one side of the vehicle.

2. In a motor vehicle having a plurality of drive wheels on each side of the vehicle and a main drive mechanism from which torque is supplied through a differential to opposed drive shafts, said drive shafts being designed to drive two drive wheels mounted on opposite sides of the vehicle, opposed auxiliary shafts rigidly mounted on opposite sides of the vehicle and designed to supply torque to the remaining drive wheels supporting the corresponding side of the vehicle, means connecting the auxiliary shafts mounted on each side of the vehicle to the opposed drive shaft which supplies power to that side of the vehicle, a braking mechanism mounted on each of the auxiliary shafts and adapted to supply the braking effect through the said shafts and gear boxes to the drive wheels which support the motor vehicle, a pair of pedals which are mounted in such a manner that they may be operated independently, an equalizing bar attached to each of the pedals, linking means connected to each of the braking mechanisms, the links attached to the braking mechanisms mounted on one side of the vehicle being attached to opposed extremities of one of the equalizing bars and the links attached to the braking mechanisms on the other side of the vehicle being attached to opposed extremities of the remaining equalizing bar, whereby each of the pedals may be operated independently and movement of one of the pedals will be transmitted equally to the braking mechanisms on one side of the vehicle.

FLOYD DE L. BROWN.